April 14, 1942.   L. M. PAYNE   2,279,489
AUTOMOBILE BODY HEATER
Filed March 1, 1937   2 Sheets-Sheet 1
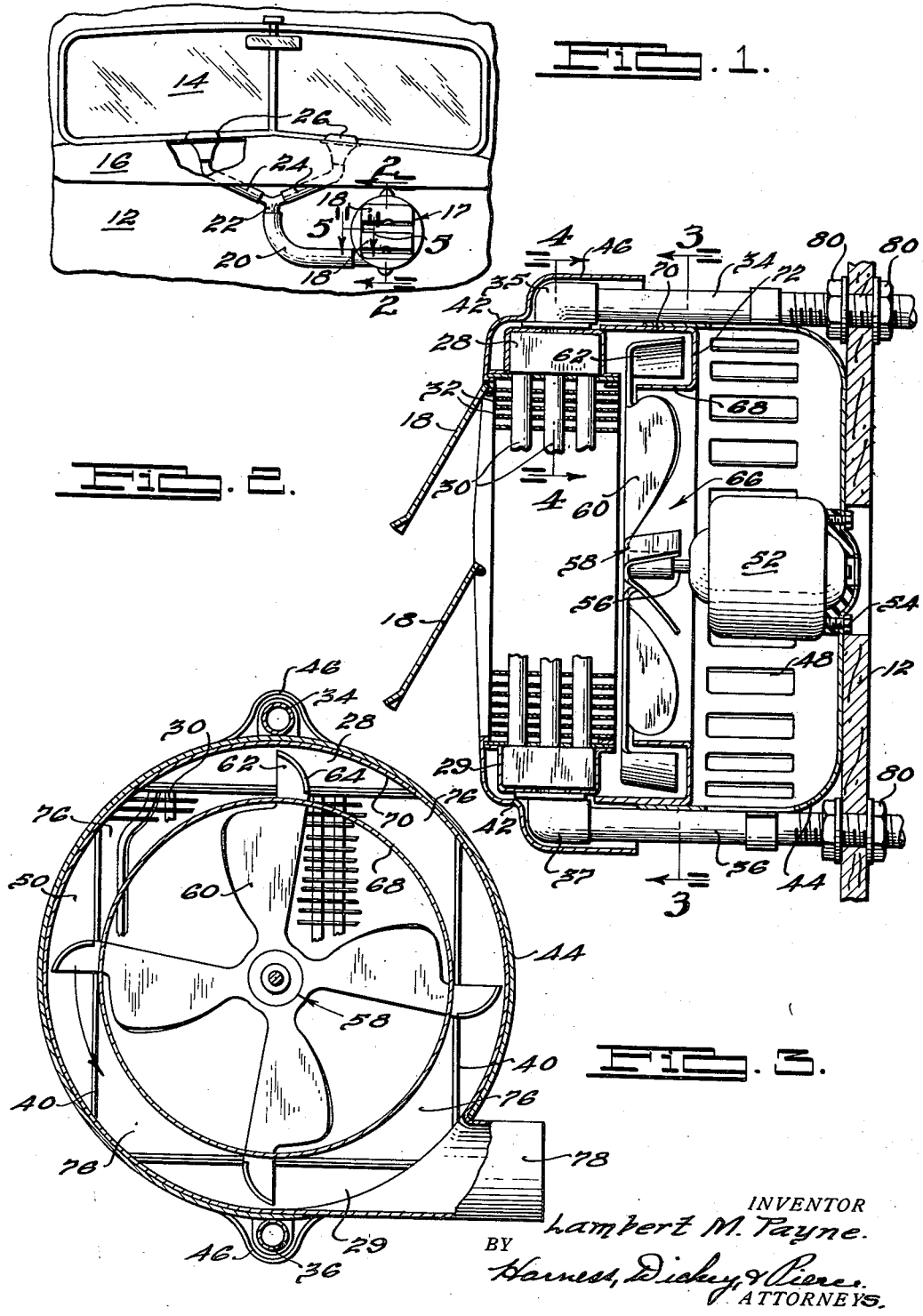
INVENTOR
Lambert M. Payne.
BY
Harness, Dickey & Pierce.
ATTORNEYS.

April 14, 1942.  L. M. PAYNE  2,279,489
AUTOMOBILE BODY HEATER
Filed March 1, 1937  2 Sheets-Sheet 2

INVENTOR
Lambert M. Payne.
BY
Harness, Dickey & Pierce
ATTORNEYS.

Patented Apr. 14, 1942

2,279,489

UNITED STATES PATENT OFFICE 2,279,489

AUTOMOBILE BODY HEATER

Lambert M. Payne, Detroit, Mich., assignor, by mesne assignments, to Eaton Manufacturing Company, Cleveland, Ohio, a corporation of Ohio Application March 1, 1937, Serial No. 128,405

11 Claims. (Cl. 257—137)

This invention relates to automobile body heaters and particularly relates to the type of heaters by which the temperature of the bulk of the air within the body may be raised and at the same time a stream of heated air may be directed against the windshield to prevent the formation, or effect the removal, of frost or ice on the windshield.

Objects of the present invention are to provide a relatively small and compact heater of the type described and of improved construction which will take up a minimum of room within the passenger compartment of the vehicle; to provide a simplified heating structure having a heating core whereby air may be forced through the core to heat the air and a portion of the heated air drawn from said core and discharged from said heater in a direction different from that of the main body of heated air discharged from the heater; to provide an improved heater having associated therewith a novel type of unitary fan members by which air is forced through said heating core by one portion of the unitary fan member and a portion of the heated air is changed in its direction of flow by the other portion of said unitary fan member and discharged from the heater in a direction different from that of the main body of air; to provide a novel unitary fan member having a portion which directs air axially forwardly and a portion which directs air centrifugally; and to provide a heater structure which is economical to manufacture, easy to install, and effective in use.

Other objects of the present invention will become apparent from the following specification, the drawings relating thereto and from the claims hereinafter set forth.

In the drawings in which like numerals are used to designate like parts in the several views throughout:

Figure 1 is a fragmentary elevational view, with parts broken away, of the interior of a vehicle having associated therewith a heating unit embodying features of the present invention;

Fig. 2 is a cross sectional view, with parts broken away, and showing parts in elevation, taken substantially along the line 2—2 of Fig. 1;

Fig. 3 is a vertical cross sectional view with parts broken away taken substantially along the line 3—3 of Fig. 2;

Figure 4:
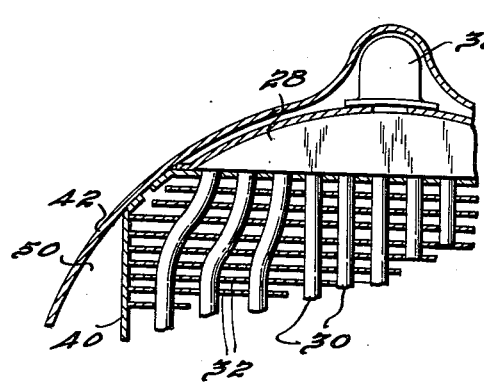
Fig. 4 is a partial cross sectional view taken substantially along the line 4—4 of Fig. 2.

In an automobile body heater of the type including a radiator, or core, heated by steam or hot water and a motor driven fan which circulates air in the body through the core for the purpose of heating the air, it has become increasingly popular in recent years to provide means for directing a portion of the air heated from the radiator against the rear face of the automobile windshield, independently of the main stream of air issuing from the heater. Such separate stream of air is directed against the inner face of the windshield in order to remove any condensed moisture in the form of fog or the like that tends to collect on the same and to melt any snow or ice on the exterior of the windshield which otherwise might tend to interfere with the vision of the driver.

One way of accomplishing this result is to provide a heater having an auxiliary fan built into the heater proper which discharges an independent stream of heated air through a tube to the windshield or other point at which it is desired to discharge it. These types of devices, as far as I am aware, are not as highly efficient as desired and additionally have been embodied in a necessarily bulky structure interfering with the leg room in the front or driver's compartment of an automobile. In at least one of such types of devices the auxiliary fan is positioned in the rear of the motor which drives the main fan and this necessitates the provision of a relatively long heater.

In accordance with the present invention a unitary fan member is provided which includes propeller blade members having radial extensions formed integrally therewith, the radial extensions providing the auxiliary fan. By this structure the combined fan elements, one of them forming a fan for directing air axially and the other a centrifugal fan, provide a structure which takes up no more room than the ordinary propeller type of fan alone. The depth of the heater within which the unitary fan member is mounted may be shortened considerably, as compared to prior types of fans employing auxiliary fans, so that a compact and small heater is provided which takes up a minimum of space within the passenger compartment.

Referring now to the accompanying drawings, in Figure 1 an automobile is illustrated having a dash 12, a windshield 14, shown as of the divided type, and an instrument panel 16. The heater assembly is shown generally at 17, it being understood that it is supported from the dash 12 and that the main flow of heated air therefrom is discharged through its front face past the usual shutters 18. The auxiliary air stream from the heater 16 is shown by way of illustration as being discharged through a tube 20 to a Y 22 from which the branches 24 lead to nozzle-like members 26 which project through openings therefor in the upper edges of the instrument panel 16 and in a position to direct the heated air therefrom against the inner face of the windshield 14 on opposite sides of the center thereof.

Referring to Figs. 2 to 5, inclusive, the heating element, or heating core, includes a pair of spaced headers 28 and 29 and interconnecting tubes 30 shown of the flattened type with the plane of thickness of the tube arranged in parallel relation to the axis of the heater. The tubes 30 communicate at each end with the spaced headers for the flow of heating medium between the headers. This heating medium may be of any suitable substance but preferably in accordance with conventional construction is either heated water from the internal combustion engine which drives the cooperating automobile, or steam which is formed as a result of the operation of the engine.

The heating medium is introduced into the header 28 through a rearwardly extending tube 34 connected to the top of the header 28 through a bend 35. The heating medium is discharged from the opposite end of the header 29 through a similar tube 36 which communicates with the interior of the header 29 through an opening in the bottom thereof and through a bent fitting 37. The tubes 34 and 36 project through the dash 12 of the automobile and are there connected with a suitable source of heating medium in such a manner as to cause a circulation of heating medium through the core.

Figure 5:
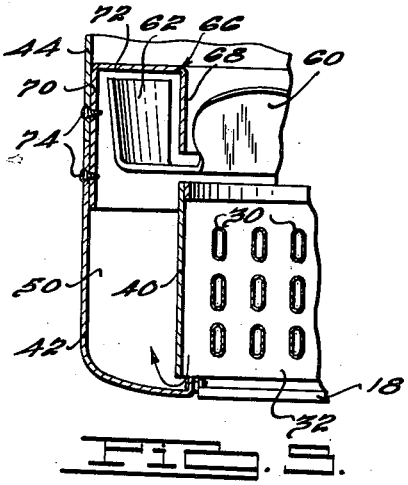
Fig. 5 is a fragmentary cross sectional view taken substantially along the line 5—5 of Fig. 1.

The tubes 30 are preferably arranged in aligned relation as best illustrated in Fig. 5, and carry a plurality of spaced transversely extending heat exchange fins 32 which serve to form passages for guiding portions of the air passing through the heater towards the sides of the core in a manner that will become more apparent hereinafter.

The heating core is preferably substantially rectangular in shape, and plate members 40 are mounted adjacent the sides of the core to confine the passage of air therethrough.

The heater assembly is provided with a casing which encloses the heating core and also encloses the fan unit and motor, which will hereinafter be described. This casing is formed in two sections, namely 42 and 44, which are preferably substantially circular in cross-section. The forward section 42 encloses the core and the forward portion of the heater assembly and is provided with diametrically opposed outwardly displaced portions 46 for housing the fitting members 35 and 37. The rear section 44 encloses the rear portion of the heater assembly and is provided with elongated openings 48 therethrough around the circumference thereof for communication with the interior of the passenger compartment and providing the air inlet openings for the heater. The sections 42 and 44 are secured relative to each other in a manner that will be hereinafter described.

The front casing portion, or section, 42 is provided with a central rectangular opening therethrough through which the main body of air heated by the heating core is discharged. The shutters 18, where employed, may be suitably hinged to the front casing parts within the rectangular opening so as to enable the effective area of the opening to be controlled and to aid in the direction of distribution of the main stream of air issuing from the heater.

The forward casing section 42 is preferably in spaced relation to the heating core so that spaces or chambers 50 are provided between portions of the casing part 42 and the side walls of the core defined by the members 40, for a purpose that will be pointed out in detail hereinafter.

A motor 52 which is preferably of the electric type is secured to the rear casing section 44 substantially centrally thereof by means of screws or bolts 54 or the like. The motor 52 is provided with driving shaft 56 to which a fan assembly 58 forming one feature of the present invention is supported and drivingly secured.

The fan assembly 58 comprises in part an axial type of fan formed by the radially extending fan propeller blades 60. Other fan elements 62 are secured to, preferably by being formed integral with, the propeller blades 60 and extend radially outwardly therebeyond to provide a centrifugal type of fan. The fan elements 62 include portions 64 which may be of curved formation as shown to form scoops and provide the centrifugal action of the outer peripheral portion of the fan element 58.

In order to provide a housing for the centrifugal fan portion formed by the element 62 and also to provide an air confining discharge conduit, an annular ring member generally indicated at 66 is provided having an inner annular wall 68 and an outer annular wall 70 open at its forward end and enclosed at its rear end by a wall 72. The inner wall member 68 is spaced outwardly from the outer tips of the propeller blades 60, and is spaced radially inwardly from the bottom edge of the curved portion 64 of the fan element 62. The bottom wall 68 terminates, preferably close to but slightly spaced from the rear face of the radially extending portion of the fan element 62, so that propeller blades 60 are free to rotate within the annular space provided by the bottom wall 68, and the fan elements 62 are free to rotate within the confining channel formed by the annular ring member 66. The annular member 66 thus serves as an air confining shroud for the fan blades 60 and also serves as a housing for the fan elements 62.

The outer annular wall portion 70 extends forwardly of the fan member 58 when the parts are in assembled position, and the forward annular edge of the outer portion 70 is telescopically received within the rear annular edge portion of the front casing section 42. The rear casing section 44 is slidably received over the annular outer portion 70 and the front casing section 42 and rear casing part 44 are mounted and held in abutting relation to each other by means of screws 74, or the like, which extend through the wall member 70.

Referring particularly to Fig. 3 it is evident that the confining channel formed by the annular ring element 66 is in open communication with the rear faces of the corner portions 76 of the core through the spaces between the fins 32 and also with the spaces or side chambers 50.

The annular ring member 66 is provided with a discharge connection 78 in the instance shown directed laterally from the heater so as to provide a connection for the duct 20 previously described and which leads to the windshield 14.

The heater assembly may be supported from the dash 12 by means of the inlet and outlet pipes 34 and 36 respectively which extend through openings in the dash and are threaded over those portions adjacent the opening through the dash for receiving thereon nuts 80 for securely holding the assembly in position. Other suitable means may be provided for mounting the heater assembly to the dash, for example, the inlet and outlet pipes 34 and 36 respectively may be loosely received through openings in the dash and other openings provided through the dash and through the rear upstanding face of the heater casing for receiving therethrough suitable means such as bolts and nuts for securing the heater assembly to the dash.

It will be understood that in operation, and assuming that a flow of heat exchange medium is being circulated through the heating core, that when the motor 52 is energized, it will cause the unitary fan member 58 to rotate thereby rotating the propeller blades 60 together with the centrifugal fan elements 62. The fan blades 60 in rotating will draw air in through the openings 48 of the casing and force the air forwardly through the circular opening formed by the inner wall 68 of the annular ring member 66, which forms a shroud for the blades 60, and through the heating core, and the air in passing therethrough will be heated and in being discharged therefrom will be directed by the doors 18 as desired. Although the greater portion of the air directed through the core passes from the heater through the front opening, a portion of the air passing through the heater will be drawn, by the suction created by the centrifugal fan elements 62, first sideways through the passages formed between the fins 32 into the corner portions 76, and thence rearwardly through such corner portions into the annular confining channel formed by the member 66. Such air, in being drawn into the corner portions 76 will, of course, be heated by its contact wtih the tubes 30 and fins 32. The heated air thus collected in the channel formed by the member 66 is discharged from the heater through the discharge conduit 78.

Referring particularly to Fig. 5 it can be seen that the sides of the heating core are separated from direct communication with the chambers 50 by the wall members 40, and it is also evident from an inspection of this figure that although the main portion of the air passing through the heater is discharged directly through the front face of the casing a portion of the air adjacent the side walls 40 is deflected by that portion of the front casing member 42 which is spaced slightly forwardly of the front edge of the wall 40 adjacent the front opening thereby aiding in directing a portion of the heated air into the chambers 50 from which it is drawn by the centrifugal fan elements.

Figure 6:
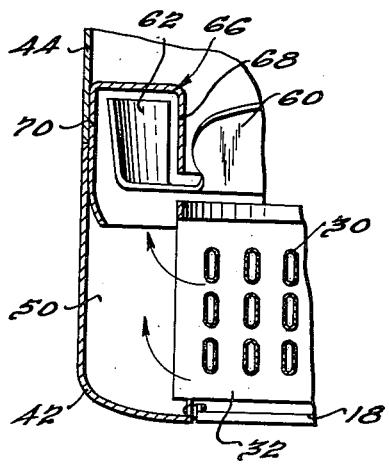
Fig. 6 is a view similar to Fig. 5 illustrating a modified form of structure according to the present invention.

Referring to Fig. 6 a modified structure is illustrated which is substantially the same as that described above in regard to Figs. 2 to 5, except that in the modification illustrated in Fig. 6 the wall members 40 are dispensed with so that the chambers 50 communicate directly with the interior of the heating core through the open sides. In this structure, in operation, the centrifugal fan element 62 draws the heated air from the core through the open sides of the core and through the chambers 50 in addition to drawing the air from the corner portions 76.

Figure 7:
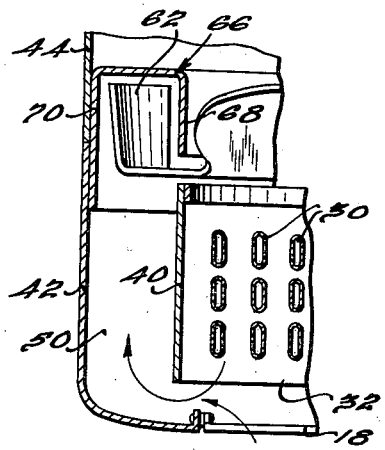
Fig. 7 is a view similar to Fig. 5 illustrating another modified form of structure according to the present invention.

Referring to Fig. 7 a structure is provided in which the front wall 80 of the front casing section 42 is spaced a substantial distance forwardly of the front face of the heating core with the edges of the casing overlapping the sides of the heating core so that the portion 80 of the casing serves as a deflector to direct a substantial portion of the air passing through the heating core into the chamber 50 from which it is drawn by the centrifugal fan element 62.

Formal changes may be made in the specific embodiment of the invention described without departing from the spirit and substance of the invention, the scope of which is commensurate with the appended claims.

What is claimed is:

1. In a heater, a heating core, said heating core being substantially rectangular in shape and having transversely extending fins, a fan member rotatably mounted in back of said core, said fan member including radially extending propeller members so constructed and arranged as to draw a stream of air into said heater and force it through said core to thereby heat said air, said fins being arranged to form passages for the flow of a portion of the air passing through said core to the corners of said core, other fan members secured to said propeller members extending radially beyond the tips of said propeller members, said other fan members being so constructed and arranged as to draw that portion of air flowing to said corners and means forming a discharge conduit associated with said other fan members confining the passage of those portions of heated air drawn by said other fan members in their discharge from the heater and maintaining those portions separate from the stream of air drawn into the heater.

2. In a heater, a substantially vertical forwardly facing heating core, said heating core being substantially rectangular in shape and having transversely extending fins, a fan member rotatably mounted about a substantially horizontal axis at the rear of said core, said fan member including radially extending propeller members so constructed and arranged as to draw a stream of air into said heater and force the air through said core to thereby heat the air, said fins being spaced to form passages for the flow of a portion of the air passing through said core to and from the corners of said core, other fan members fixed with respect to said propeller members and extending radially outwardly therebeyond forming a peripheral fan portion on said first named fan member to draw a portion of the air passing through said core to said corners, and an annular means so arranged relative to said propeller members and said other fan members as to form an air confining discharge conduit for discharging those portions of heated air drawn by the other fan members in discharging said air from the heater and maintaining those portions separate from the stream of air drawn into the heater.

3. In a heater, a casing, a heating core within said casing, said heating core being substantially rectangular in shape and having transversely extending fins, plate members confining the sides of said core, a fan member rotatably mounted in back of said core within said casing, said fan member including radially extending propeller members so constructed and arranged as to force air through said core to thereby heat said air, said fins being spaced to form passages for the flow of a portion of the air passing through said core to the corners of said core, other fan members integral with said propeller members and extending radially outwardly therebeyond forming a peripheral fan portion on said first named fan member to draw those portions of air flowing to said corners out of said core, and means forming a discharge conduit associated with said other fan members confining the passage of that portion of the heated air drawn by said other fan members from said heater.

4. In a heater, a core, said heating core being substantially rectangular in shape and being open at its sides, a casing enclosing said heating core and spaced from a side of said heating core to provide an air chamber adjacent said side of said core in open communication with an edge of said core, a fan member rotatably mounted in back of said core, said fan member including radially extending propeller members so constructed and arranged as to force air through said core to thereby heat said air, other fan members drawing the heated air from said chamber, and means forming a discharge conduit associated with said other fan members confining the passage of those portions of air drawn by said other fan members in their discharge from the heater.

5. In a heater, a heating core, said heating core being substantially rectangular in shape and having transversely extending fin members, a casing enclosing said heating core in spaced relation to the sides of said core to provide air chambers, said casing having a forwardly facing opening therethrough positioned in front of said heating core, the walls of said casing defining said opening being spaced forwardly of said core and extending inwardly toward the center of said core in overlapping relationship to the side margins of said core, a fan member rotatably mounted in back of said core, said fan member including radially extending propeller members so constructed and arranged as to force air through said core to thereby heat said air and to discharge the main portion of said air through said forwardly facing opening, said overlapping portions of said casing deflecting a portion of the air passing through said core into said chambers, other fan members associated with said chambers for drawing heated air therefrom, and means forming a discharge conduit associated with said other fan members communicating with said chambers.

6. In a heater, a heating core, a fan member rotatably mounted in back of said core, said fan member including radially extending propeller members so constructed and arranged as to force air through said core to thereby heat said air, other fan members integral with said propeller members and extending radially outwardly therebeyond, and means forming a housing for said other members, said housing having an opening to receive air from said core and having an annular wall adjacent the outer ends of said propeller members providing an air confining conduit for said propeller members.

7. In a combined heater and defroster, a heating radiator having air passages, a blade type fan for impelling air through certain of said passages, and a blower type fan integrally formed with and located at the periphery of the blades of the first mentioned fan and operable to impel air through others of said passages, and a housing surrounding said blower type fan communicating with said passages, said housing having a wall forming a confining chamber for said blade type fan.

8. In a combined heater and defroster, a heating radiator having air passages, a fan for impelling air through certain of said passages, a blower for impelling air through others of said passages, said blower being of an internal diameter as great as the external diameter of said fan, and a casing within which said blower operates, said casing being located in close proximity to said heating radiator.

9. In a combined heater and defroster, a heating radiator having air passages, a fan for impelling air through the more centrally located passages, a blower for impelling air through others of said passages radially removed from the first mentioned passages, and a casing for said blower supported in close proximity to said heating radiator, whereby the air impelled by said blower enters directly from said air passages into said casing.

10. A device of the class described, comprising a radiator, means for forcing a larger volume of air at relatively low velocity through a relatively large area of said radiator, means for drawing air through a substantially smaller area of the radiator, and delivering the same centrifugally at relatively high velocity, said last mentioned means being attached peripherally of the first mentioned forcing means.

11. A combined automobile heater and defroster comprising a radiator, a propeller of the axial flow type for delivering air at relatively low velocity through a relatively larger area of the radiator, and an impeller of the centrifugal delivery type for drawing air through a relatively smaller area of said radiator and delivering the same at a relatively substantially higher velocity, said impeller being attached at the periphery of the propeller.

LAMBERT M. PAYNE.